United States Patent
Lettmann et al.

[19]

[11] Patent Number: 6,162,506
[45] Date of Patent: Dec. 19, 2000

[54] AQUEOUS COATING MATERIALS AND METHODS OF MAKING AND USING SAME

[75] Inventors: Bernhard Lettmann, Drensteinfurt; Hermann Brüggemann, Münster; Michael Hartung, Geseke, all of Germany

[73] Assignee: BASF Coatings AG, Meunster-Hiltrup, Germany

[21] Appl. No.: 09/424,932

[22] PCT Filed: May 20, 1998

[86] PCT No.: PCT/EP98/02952

§ 371 Date: Nov. 30, 1999

§ 102(e) Date: Nov. 30, 1999

[87] PCT Pub. No.: WO98/54266

PCT Pub. Date: Dec. 3, 1998

[30] Foreign Application Priority Data

May 31, 1997 [DE] Germany ............ 197 22 862

[51] Int. Cl.⁷ .................. B05D 1/36; B05D 3/02; B05D 7/16
[52] U.S. Cl. .............. 427/407.1; 427/409; 524/413
[58] Field of Search .............. 524/413; 427/407.1, 427/409

[56] References Cited

U.S. PATENT DOCUMENTS 5,219,900  6/1993  Davies et al. ............ 523/201

FOREIGN PATENT DOCUMENTS

| | | |
|---|---|---|
| 0 038 127 A1 | 3/1981 | European Pat. Off. . |
| 0 297 576 A1 | 6/1988 | European Pat. Off. . |
| 0 353 797 A1 | 6/1989 | European Pat. Off. . |
| WO 91/15528 | 10/1991 | European Pat. Off. . |
| 0 522 419 A1 | 6/1992 | European Pat. Off. . |
| 0 522 420 A2 | 6/1992 | European Pat. Off. . |
| 40 10 176 A1 | 3/1990 | Germany . |
| 43 39 870 A1 | 5/1995 | Germany . |

OTHER PUBLICATIONS

Database WPIL on Questel, week 9347, London: Derwent Publications Ltd. AN 93–374748; and JP, A, 05–279620 Oct. 1993.

*Primary Examiner*—Erma Cameron

[57] ABSTRACT

The invention relates to an aqueous coating material. The aqueous coating material comprises 5–95% by weight (based on the overall binder content) of a binder component a) and 5–95% by weight (based on the overall binder content) of a binder component b). The binder component a) is obtainable by free-radical polymerization of an aqueous dispersion of a polyurethane resin with ethylenically unsaturated monomers and in the presence of a water-insoluble initiator. The binder component b) is obtainable by polymerizing ethylenically unsaturated monomers in an organic solvent or in a mixture of organic solvents and in the presence of a polyurethane resin and converting the resulting binder component b) into an aqueous dispersion.

18 Claims, No Drawings

AQUEOUS COATING MATERIALS AND METHODS OF MAKING AND USING SAME

This application is the national stage of International Application No. PCT/EP98/02952, filed May. 20, 1998.

FIELD OF THE INVENTION

The invention relates to an aqueous coating material and to the use of such a material in a process for producing two-coat paint systems.

BACKGROUND ART

Aqueous coating materials are used in particular to produce two-coat automotive topcoat systems of the basecoat-clearcoat type. In such systems, coating materials according to the invention are particularly the basecoat materials or basecoats. The quality of a paint system obtainable by a process for producing two-coat paint systems depends critically on the aqueous basecoat employed.

EP-A-353 797 describes aqueous coating materials which can be used as basecoats. The binder present in these known coating materials is a polymer obtainable by subjecting acrylate and/or methacrylate monomers to an emulsion polymerization, initiated by means of water-soluble initiators in the presence of an anionic polyurethane resin, which may also contain vinyl groups. If the aqueous coating materials described in EP-A-353 797 are used as basecoats in the process referred to above, the resulting two-coat paint systems are unsatisfactory in their stability to condensed moisture. This disadvantage is evident in particular with refinishes, which are cured only at temperatures of up to 80° C. Furthermore, the aqueous coating materials described in EP-A-353 797 display unsatisfactory stability on storage if they include a melamine resin as additional binder component.

EP-A-297 576 describes a process for producing two-coat paint systems of the type described above in which the basecoat used comprises aqueous coating materials comprising an aqueous polymer dispersion obtainable by polymerizing ethylenically unsaturated monomers in an aqueous dispersion in the presence of a polyurethane resin which contains urea groups but no vinyl groups. If the aqueous coating materials described in EP-A-297 576 are used as basecoats in the process referred to above for producing two-coat paint systems, then the two-coat paint systems obtained are in need of improvement in terms of their resistance to condensed water. Furthermore, the aqueous coating materials described in EP-A-297 576 are frequently observed to show deficient stability on storage and defects whose root cause is incompatibility, if combinations of different binders are used.

DE-A-40 10 176 describes a process for producing a two-coat paint system using an aqueous basecoat comprising as binder a polymer obtainable by polymerizing ethylenically unsaturated monomers in an organic solvent in the presence of a polyurethane resin containing polymerizable double bonds and converting the resultant reaction product into an aqueous dispersion. If basecoats containing metal pigments are used in the process described in DE-A-40 10 176, the resulting two-coat metallic systems are in need of improvement in terms of their metal effect. Finally, the stone-chip resistance is also capable of improvement.

The reference DE P 4339870.7 discloses an aqueous coating material based on an aqueous dispersion of a polyurethane resin which is polymerized with ethylenically unsaturated monomers in the presence of a water-insoluble initiator. A lack of sufficient shear stability means that this known coating material is poorly suited to the dispersion of pigments.

The references EP 522419 and EP 522420 disclose the polymerization of monomers in the presence of polyurethane dispersions containing polymerizable double bonds. In accordance with these references, the polymerization is conducted using water-soluble initiators, resulting in unsatisfactory stability on storage of coating materials prepared using such binders. The polymerization, moreover, is carried out in the aqueous phase, leading to binders of comparatively poor suitability for the dispersion of pigments.

The technical problem on which the invention is based is to provide a novel aqueous coating material for producing two-coat paint systems of the type referred to above, with which paint systems are obtained whose technical properties are improved in comparison with the prior art and which, in particular, feature the above-described disadvantages of the prior art to a reduced extent, if at all.

SUMMARY OF THE INVENTION

This object is surprisingly achieved by means of an aqueous coating material which comprises 5–95% by weight (based on the overall binder content) of a binder component a) and 5–95% by weight (based on the overall binder content) of a binder component b), the binder component a) being obtainable by subjecting an ethylenically unsaturated monomer or a mixture of ethylenically unsaturated monomers to free-radical polymerization in an aqueous dispersion of a polyurethane resin which has a number-average molecular weight of from 1000 to 30,000 and contains on average from 0.05 to 1.1 polymerizable double bonds per molecule and in the presence of a water-insoluble initiator or of a mixture of water-insoluble initiators, the weight ratio between the polyurethane resin and the ethylenically unsaturated monomer or mixture of ethylenically unsaturated monomers being between 1:10 and 10:1, and the binder component b) being obtainable by subjecting (A) an ethylenically unsaturated monomer or a mixture of ethylenically unsaturated monomers to polymerization in an organic solvent or in a mixture of organic solvents and in the presence of (B) a polyurethane resin having a number average molecular weight of from 200 to 30,000 and containing on average from 0.05 to 1.1 polymerizable double bonds per molecule and converting the resulting binder component b) into an aqueous dispersion.

In addition to binder components a) and b), further binder components may also be present in the coating material. In particular, crosslinking agents such as, for example, melamine resins may be present additionally. The aqueous coating material is prepared by mixing the two (aqueous) binder components a) and b), with or without further customary additives or auxiliaries, and a crosslinking agent and then combining them homogeneously by stirring or the like.

The basic concept of the invention consists, accordingly, in the combination of two binders known per se from the prior art. Surprisingly, such a combination of these binders, used and developed per se as individual components, in one coating material displays a considerable synergistic effect in terms of the technical properties of a coating system produced with a coating material of the invention. It has in fact been found that such a coating system of the invention exhibits an excellent stone-chip resistance, in particular, in comparison with the prior art. The advantageous technical properties of such systems relate both to production-line finishes (OEM finishes) and to refinishes.

DETAILED DESCRIPTION

In one preferred embodiment of the invention the polyurethane resin of the binder component a) comprises acrylate, methacrylate and/or allyl ether groups as groups containing polymerizable double bonds. It is advantageous for the polyurethane resin of the binder component a) to be anionic and to have an acid number of from 20 to 60. As ethylenically unsaturated monomers of the binder component a) it is preferred to use a mixture of (i) from 40 to 100% by weight of an aliphatic or cycloaliphatic ester of acrylic acid or methacrylic acid containing neither hydroxyl nor carboxyl groups, or a mixture of such esters, (ii) from 0 to 30% by weight of an ethylenically unsaturated monomer which carries at least one hydroxyl group in the molecule, or a mixture of such monomers, (iii) from 0 to 10% by weight of an ethylenically unsaturated monomer which carries at least one carboxyl group in the molecule, or a mixture of such monomers, (iv) from 0 to 50% by weight of an ethylenically unsaturated monomer other than (i), (ii) and (iii), or a mixture of such monomers, and (v) from 0 to 5% by weight of an ethylenically polyunsaturated monomer or a mixture of such monomers, the sum of the weight fractions of (i), (ii), (iii), (iv) and (v) always being 100% by weight.

In terms of the binder component b), the following developments are judicious and/or advantageous. The polymer of the binder component b), which is prepared from (A) and (B), can have an acid number of from 5 to 200, preferably from 10 to 40, with particular preference from 15 to 30, a hydroxyl number of from 0 to 100, preferably from 20 to 80, and a number-average molecular weight of from 2000 to 20,000, preferably from 5000 to 12,000. The polymer of the binder component b) prepared from (A) and (B) advantageously has a polydispersity index $Q=M_w:M_n$ of from 5 to 90, preferably from 10 to 30. The polymer of the binder component b) is obtainable using components (A) and (B) in a weight ratio of from 1:10 to 10:1, preferably from 1:2 to 2:1, with particular preference 1:1. As component (B) of the binder component b) it is possible to use a polyurethane resin containing polymerizable double bonds which have been introduced by incorporating compounds containing not only a polymerizable double bond but also at least two NCO-reactive groups into the molecules of the polyurethane resin. Specifically, the polyurethane resin which can be used as component (B) of the binder component b) comprises allyl ether groups, especially trimethylolpropane monoallyl ether, as polymerizable double bonds. It is also preferred for the polymer of the binder component b) to be obtainable using as component (B) a polyurethane resin which has an acid number of from 0 to 2.0. Specifically, it is desirable for the polymer of the binder component b) to be obtainable using as component (B) a polyurethane resin which has a number-average molecular weight of from 1000 to 5000 and contains on average from 0.2 to 0.9, preferably from 0.3 to 0.7, polymerizable double bonds per molecule.

An aqueous coating material of the invention generally comprises pigments, especially solid-color pigments. Of course, however, effect pigments such as metal pigments and/or mica pigments may also be incorporated in addition. In principle, however, a coating material of the invention can also be formulated as a clearcoat and hence be intended for application to a pigmented basecoat.

The invention additionally relates to the use of an aqueous coating material of the invention as the pigmented basecoat in a process for producing a twocoat paint system on a substrate surface, in which (1) the basecoat is applied to the substrate surface, (2) a polymer film is formed from the basecoat applied in stage (1), (3) a transparent topcoat is applied to the resulting basecoat film, and subsequently (4) the basecoat film is baked together with the topcoat film, and also to the use of a coating material of the invention for coating motor vehicle bodies or motor vehicle bodywork parts.

The preparation of the binder component a) is described in detail below. The aqueous dispersion of the polyurethane resin required for this purpose can be prepared by using (a1) a polyesterpolyol and/or polyetherpolyol having a number-average molecular weight of from 400 to 5000 or a mixture of such polyesterpolyols and/or polyetherpolyols, and (a2) a polyisocyanate or a mixture of polyisocyanates, together if desired with a monoisocyanate or a mixture of monoisocyanates, and (a3) a compound which has in the molecule at least one isocyanate-reactive group and at least one group which is capable of forming anions, or a mixture of such compounds, or (a4) a compound which contains in the molecule at least one NCO-reactive group and at least one poly(oxyalkylene) group, or a mixture of such compounds, or (a5) a mixture of components (a3) and (a4), and (a6) if desired, a compound which contains not only a polymerizable double bond but also at least one NCO-reactive group, or a mixture of such compounds, and (a7), if desired, a hydroxyl- and/or amino-containing organic compound having a molecular weight of from 60 to 399 or a mixture of such compounds to prepare a polyurethane resin which has a number-average molecular weight of from 1000 to 30,000, preferably from 1500 to 20,000, and which contains on average from 0.05 to 1.1, preferably from 0.2 to 0.9, polymerizable double bonds, and dispersing this resin in water.

The polyurethane resin for the binder component a) can be prepared either in bulk or in organic solvents.

The polyurethane resin for the binder component a) can be prepared by reacting all starting compounds simultaneously. In many cases, however, it is judicious to prepare the polyurethane resin in stages. Thus it is possible, for example, to use components (a1) and (a2) to prepare a prepolymer which contains isocyanate groups and is then reacted further with component (a3) or (a4) or (a5). It is also possible to use components (a1) and (a2) and (a3) or (a4) or (a5) and, if desired, (a6) to prepare a prepolymer which contains isocyanate groups and can then be reacted with component (a7) to give a polyurethane resin of higher molecular mass. The reaction with component (a7) can be carried out in bulk or—as described, for example, in EP-A-297 576—in water. In cases where a compound used as component (a6) contains only one isocyanate-reactive group, it is possible in a first stage to use (a2) and (a6) to prepare a precursor which contains isocyanate groups and can then be reacted further with the other components.

The reaction of the components (a1) to (a7) can also be carried out in the presence of catalysts, such as dibutyltin dilaurate, dibutyltin maleate and tertiary amines, for example.

The amounts of component (a1), (a2), (a3), (a4), (a5), (a6) and (a7) to be used are a function of the target number-average molecular weight and of the target acid number. The polymerizable double bonds can be introduced into the polyurethane molecules by using components (a1) having polymerizable double bonds and/or components (a2) having polymerizable double bonds and/or by means of the component (a6). It is preferred to introduce the polymerizable double bonds by way of the component (a6). It is also preferred to introduce into the polyurethane resin molecule acrylate, methacrylate or allyl ether groups as groups containing polymerizable double bonds.

As component (a1) it is possible to use saturated and unsaturated polyester- and/or polyetherpolyols, especially polyester- and/or polyetherdiols having a number-average molecular weight of from 400 to 5000. Examples of suitable polyetherdiols are polyetherdiols of the general formula H(—O—(CHR$^1$)$_n$—)$_m$OH in which R$^1$ is hydrogen or a lower, substituted or unsubstituted alkyl radical, n is from 2 to 6, preferably from 3 to 4, and m is from 2 to 100, preferably from 5 to 50. Examples are linear or branched polyetherdiols such as poly(oxyethylene) glycols, poly(oxypropylene) glycols and poly(oxybutylene) glycols. The polyetherdiols selected should not introduce excessive quantities of ether groups, since otherwise the polymers formed swell in water. The preferred polyetherdiols are poly(oxypropylene) glycols in the molar mass range Mn from 400 to 3000.

Polyesterdiols are prepared by esterifying organic dicarboxylic acids or their anhydrides with organic diols or are derived from a hydroxycarboxylic acid or a lactone. In order to prepare branched polyesterpolyols it is possible to use a minority of polyols or polycarboxylic acids having a higher functionality. The dicarboxylic acids and diols can be linear or branched aliphatic, cycloaliphatic or aromatic dicarboxylic acids or diols.

The diols used to prepare the polyesters consist, for example, of alkylene glycols, such as ethylene glycol, propylene glycol, butylene glycol, 1,4-butanediol, 1,6-hexanediol, neopentylglycol and other diols, such as dimethylolcyclohexane. It is also possible, however, to add small amounts of polyols, such as trimeth-ylolpropane, glycerol and pentaerythritol. The acid component of the polyester consists primarily of low molecular mass dicarboxylic acids or their anhydrides having 2 to 44, preferably 4 to 36, carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloro-heptanedicarboxylic acid, tetrachlorophthalic acid and/or dimerized fatty acids. Instead of these acids it is also possible to use their anhydrides, where they exist. In the formation of polyesterpolyols it is also possible for relatively small amounts of carboxylic acids having 3 or more carboxyl groups to be present, examples being trimellitic anhydride or the adduct of maleic anhydride with unsaturated fatty acids.

It is also possible to use polyesterdiols obtained by reacting a lactone with a diol. They are notable for the presence of terminal hydroxyl groups and repeating polyester units of the formula (–CO—(CHR$^2$)$_n$—CH$_2$—O). In this formula, n is preferably from 4 to 6 and the substituent R$^2$ =hydrogen or an alkyl, cycloalkyl or alkoxy radical. No substituent contains more than 12 carbon atoms. The total number of carbon atoms in the substituent does not exceed 12 per lactone ring. Examples thereof are hydroxycaproic acid, hydroxy-butyric acid, hydroxydecanoic acid and/or hydroxy-stearic acid.

For the preparation of the polyesterdiols preference is given to the unsubstituted epsilon-caprolactone, where n has the value 4 and all substituents R2 are hydrogen. The reaction with lactone is initiated by means of low molecular mass polyols such as ethylene glycol, 1,3-propanediol, 1,4-butanediol and dimethylolcyclohexane. However, it is also possible to react other reaction components, such as ethylenediamine, alkyldialk-anolamines or else urea, with caprolactone. Further suitable diols of relatively high molecular mass are polylactamdiols, which are prepared by reacting, for example, epsilon-caprolactam with low molecular mass diols.

If polymerizable double bonds are to be introduced into the polyurethane molecules by way of component (a1), then it is necessary to use components (a1) which contain polymerizable double bonds. Examples of such components (a1) are polyesterpolyols, preferably polyesterdiols, which have been prepared using polyols or polycarboxylic acids containing polymerizable double bonds, preferably polyols containing polymerizable double bonds. Examples of polyols containing polymerizable double bonds are trimethylolpropane monoallyl ether, glycerol monoallyl ether, pentaerythritol monoallyl ether and pentaerythritol diallyl ether.

As component (a2) it is possible to use aliphatic and/or cycloaliphatic and/or aromatic polyisocyanates. Examples of aromatic polyisocyanates are phenylene diisocyanate, tolylene diisocyanate, xylylene diisocyanate, biphenylene diisocyanate, naphthylene diisocyanate, and diphenyl-methane diisocyanate.

Because of their good resistance to ultraviolet light, (cyclo)aliphatic polyisocyanates give rise to products having little tendency to yellow. Examples of cycloaliphatic polyisocyanates are isophorone diisocyanate, cyclopentylene diisocyanate, and the hydrogenation products of the aromatic diisocyanates, such as cyclohexylene diisocyanate, methylcyclohexylene diisocyanate and dicyclohexyl-methane diisocyanate. Aliphatic diisocyanates are compounds of the formula OCN—(CR$^3{}_2$)$_r$—NCO, in which r is an integer from 2 to 20, in particular from 6 to 8, and R$^3$, which can be identical or different, is hydrogen or a lower alkyl radical of 1 to 8 carbon atoms, preferably 1 or 2 carbon atoms. Examples thereof are trimethylene diisocyanate, tetramethylene diisocyanate, pentamethylene diisocyanate, hexamethylene diisocyanate, propylene diisocyanate, ethyl-ethylene diisocyanate, dimethylethylene diisocyanate, meth-yltrimethylene diisocyanate and trimethylhexane diisocyanate. A further example of an aliphatic diisocyanate is tetramethylxylene diisocyanate.

Particularly preferred diisocyanates used are hexamethylene diisocyanate, isophorone diisocyanate, tetramethylxylene diisocyanate and dicyclohexylmethane diisocyanate.

In terms of the functionality of the polyisocyanates, the composition of component (a2) must be such that no crosslinked polyurethane resin is obtained. In addition to diisocyanates, component (a2) may also include a fraction of polyisocyanates having functionalities of more than two—triisocyanates, for example.

Products which have been found suitable for use as triisocyanates are those resulting from the trlmerization or oligomerization of diisocyanates or from reaction of diisocyanates with polyols or polyarnines. Examples of these include the biuret of hexamethylene diisocyanate and water, the isocyanurate of hexamethylene diisocyanate, or the adduct of isophorone diisocyanate with trimethylolpropane. The average functionality can be lowered, if desired, by adding monoisocyanates. Examples of such chain-terminating monoisocyanates are phenyl isocyanate, cyclohexyl isocyanate, 1-(1-isocyanato-1-methylethyl)3-(1-methylethenyl)benzene, and stearyl isocyanate.

In order to be able to convert the polyurethane resin in question to a stable dispersion in water, it must contain hydrophilic groups. These hydrophilic groups are introduced into the polyurethane resin by means of the component (a3) or the component (a4) or the component (a5). The groups of component (a3) which are capable of forming anions are neutralized with a base, preferably a tertiary amine, such as dimethylethanolamine, triethylamine, tripropylamine and tributylamine, or else aminomethylpropanol, for example, prior to or during the dispersion of the polyurethane resin in water, so that after neutralization the polyurethane resin contains anionic groups. Where the component (a3) is used exclusively as the component supplying hydrophilic groups, component (a3) is used in an amount such that the polyurethane resin has an acid number of from 15 to 80, preferably from 20 to 60. Where the component (a4) is used exclusively as the component supplying hydrophilic groups, component (a4) is used in an amount such that the polyurethane resin contains from 5 to 40, preferably from 10 to 30, % by weight of oxyalkylene groups, including if appropriate oxyalkylene groups introduced by means of the component (a1). Where the component (a5) is used as the component supplying hydrophilic groups, the amounts of component (a3) and (a4) to be used are situated, in accordance with the mixing ratio, between the values indicated above for the cases in which component (a3) or (a4), respectively, is used as the sole supplier of hydrophilic groups. In any case, the skilled worker can easily determine the amounts of components (a3), (a4) or (a5) to be used by means of simple routine experiments. He or she need only test, by means of simple serial experiments, how high the proportion of hydrophilic groups need be, at least, in order to obtain a stable aqueous polyurethane resin dispersion. He or she can of course also use common dispersing auxiliaries, such as emulsifiers, for example, in order to stabilize the polyurethane resin dispersions. The use of dispersing auxiliaries, however, is not preferred, since it generally increases the sensitivity of the resulting coating systems to moisture.

As component (a3) it is preferred to use compounds which contain two isocyanate-reactive groups in the molecule. Suitable isocyanate-reactive groups are, in particular, hydroxyl groups, and also primary and/or secondary amino groups. Suitable groups capable of forming anions are carboxyl groups, sulfonic acid groups and/or phosphonic acid groups, carboxyl groups being preferred. As component (a3) it is possible, for example, to use alkanoic acids having two substituents on the α carbon atom. The substituent can be a hydroxyl group, an alkyl group or, preferably, an alkylol group. These alkanoic acids have at least one, generally from 1 to 3, carboxyl groups in the molecule. They have from 2 to about 25, preferably from 3 to 10, carbon atoms. Examples of component (a3) are dihydroxypropionic acid, dihydroxysuccinic acid and dihydroxybenzoic acid. A particularly preferred group of alkanoic acids are the α,α-dimethylolalkanoic acids of the general formula $R^4$—C(CH$_2$OH)$_2$COOH, where $R^4$ is a hydrogen atom or an alkyl group having up to about 20 carbon atoms.

Examples of such compounds are 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of compounds containing amino groups are α,ω-diaminovaleric acid, 3,4-diaminobenzoic acid, 2,4-diaminotoluenesulfonic acid and 2,4-diaminodiphenyl ether sulfonic acid.

With the aid of component (a4) it is possible to introduce poly(oxyalkylene) groups as nonionic stabilizing groups into the polyurethane molecules. As component (a4) it is possible, for example, to use the following: alkoxypoly(oxyalkylene) alcohols having the general formula R'O—(—CH$_2$—CHR"O)$_n$H, in which R' is an alkyl radical having 1 to 6 carbon atoms, R" is a hydrogen atom or an alkyl radical having 1 to 6 carbon atoms, and n is a number between 20 and 75.

Component (a6) is used to introduce polymerizable double bonds into the polyurethane resin molecules. It is preferred to use as component (a6) a compound which contains at least one NCO-reactive group and one polymerizable double bond. Particular preference is given to using, as component (a6), compounds which in addition to a polymerizable double bond also contain two NCO-reactive groups. Examples of NCO-reactive groups are —OH, —SH, >NH and —NH$_2$ groups, preference being given to —OH, >NH and NH$_2$ groups. Examples of compounds which can be used as component (a6) are hydroxy (meth)acrylates, especially hydroxyalkyl (meth)acrylates such as hydroxyethyl, hydroxypropyl, hydroxybutyl or hydroxyhexyl (meth)acrylate and 2,3-dihydroxypropyl (meth)acrylate, 2,3-dihydroxypropyl monoallyl ether, 2,3-dihydroxypropanoic acid allyl ester, glycerol mono(meth)acrylate, glycerol monoallyl ether, pentaerythritol mono(meth)acrylate, pentaerythritol di(meth)acrylate, pentaerythritol monoallyl ether, oentaerythritol diallyl ether, trimethylolpropane monoallyl ether, trimethylolpropane mono(meth)acrylate and trimethylolpropane diallyl ether. As component (a6) it is preferred to use trimethylolpropane monoallyl ether, glycerol mono(meth)acrylate, pentaerythritol di(meth)acrylate, pentaerythritol diallyl ether, glycerol monoallyl ether and trimethylolpropane mono(meth)acrylate. As component (a6) it is particularly preferred to use trimethylolpropane monoallyl ether, glycerol monoallyl ether and 2,3-dihydroxypropanoic acid allyl ester. It is preferred to incorporate those components (a6) which contain at least two NCO-reactive groups into the polyurethane molecules in chain positions (not terminal positions).

As component (a7) it is possible, for example, to use polyols having up to 36 carbon atoms per molecule such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A and mixtures thereof. The polyols are generally used in amounts of up to 30 percent by weight, preferably from 2 to 20 percent by weight, based on the amount of component (a1) and (a7) employed.

As component (a7) it is also possible to use diamines and/or polyamines having primary and/or secondary amino groups. Polyamines are essentially alkylene polyamines having 1 to 40 carbon atoms. They may carry substituents which have no hydrogen atoms that are reactive with isocyanate groups. Examples are polyamines of linear or branched aliphatic, cycloaliphatic or aromatic structure with at least two amino groups. Diamines are hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine, 4,4'-diaminodicyclohexylmethane and aminoethylethanolamine. Preferred diamines are hydrazine, alkyl- or cycloalkyl-diamines such as propylenediamines, aminoethylethanolamine and 1-amino-3-aminomethyl-3,5,5-trimethylcyclohexane. It is also possible to use, as component (a7), polyamines containing more than two amino groups in the molecule. In such cases, however, it should be ensured—by using monoamines as well, for example—that no crosslinked polyurethane resins are obtained. Such polyamines which can be used are diethylenetriamine, triethylenetetramine, dipropylenetriamine and dibutylenetriamine. Ethylhexylamine is cited as an example of a monoamine.

As ethylenically unsaturated monomers in the context of the binder component a) it is preferred to use mixtures consisting of from 40 to 100, preferably from 60 to 90% by weight of component (i), from 0 to 30, preferably from 0 to 25% by weight of component (ii), from 0 to 10, preferably from 0 to 5% by weight, with very particular preference 0% by weight of component (iii) and from 0 to 50, preferably from 0 to 30% by weight of component (iv) and also from 0 to 5, preferably 0% by weight of component (v), the sum of the weight fractions of (i), (ii), (iii), (iv) and (v) always being 100% by weight.

As component (i) it is possible, for example, to use: cyclohexyl acrylate, cyclohexyl methacrylate, alkyl acrylates and alkyl methacrylates having up to 20 carbon atoms in the alkyl radical, such as, for example, methyl, ethyl, propyl, butyl, hexyl, ethylhexyl, stearyl and lauryl acrylate and methacrylate, or mixtures of these monomers.

As component (ii) it is possible for example, to use: hydroxyalkyl esters of acrylic acid, methacrylic acid or another $\alpha,\beta$-ethylenically unsaturated carboxylic acid. These esters can be derived from an alkylene glycol, which is esterified with the acid, or can be obtained by reacting the acid with an alkylene oxide. As component (ii) it is preferred to use hydroxyalkyl esters of acrylic acid and methacrylic acid in which the hydroxyalkyl group contains up to 6 carbon atoms, or mixtures of these hydroxyalkyl esters. Examples of such hydroxyalkyl esters are 2-hydroxyethyl acrylate, 2-hydroxypropyl acrylate, 2-hydroxypropyl methacrylate, 3-hydroxypropyl acrylate, 3-hydroxypropyl methacrylate, 2-hydroxyethyl methacrylate, 3-hydroxybutyl (meth)acrylate or 4-hydroxybutyl (meth)acrylate. Corresponding esters of other unsaturated acids, such as ethacrylic acid, crotonic acid and similar acids having up to about 6 carbon atoms per molecule, for example, can also be used.

As component (iii) it is preferred to use acrylic acid and/or methacrylic acid. However, it is also possible to use other ethylenically unsaturated acids having up to 6 carbon atoms in the molecule. Examples of such acids are ethacrylic acid, crotonic acid, maleic acid, fumaric acid and itaconic acid.

As component (iv) it is possible, for example, to use: vinylaromatic hydrocarbons, such as styrene, $\alpha$-alkylstyrenes and vinyltoluene, acrylamide and methacrylamide and acrylonitrile and methacrylonitrile, or mixtures of these monomers.

As components (v) it is possible to use compounds which contain at least two free-radically polymerizable double bonds in the molecule. Examples are divinylbenzene, p-methyldivinylbenzene, o-nonyldivinylbenzene, ethanediol di(meth)acrylate, 1,4-butanediol di(meth) acrylate, 1,6-hexanediol di(meth)acrylate, trimethylolpropane tri(meth)acrylate, pentaerythritol di(meth)acrylate, allyl methacrylate, diallyl phthalate, butanediol divinyl ether, divinylethyleneurea, divinylpropyleneurea, diallyl maleate, etc.

Examples of water-insoluble initiators which can be used are water-insoluble azo compounds and water-insoluble peroxy compounds. Examples of water-insoluble azo compounds are 2,2'-azobis(isobutyronitrile), 2,2'-azobis (isovaleronitrile), 1,1'-azobis(cyclohexanecarbonitrile) and 2,2'-azobis(2,4-dimethylvaleronitrile). Examples of water-insoluble peroxy compounds are t-amyl peroxyethylhexanoate, t-butyl peroxyethylhexanoate, dilauryl peroxide, dibenzoyl peroxide and 1,1-dimethyl3-hydroxybut-1-yl peroxyethylhexanoate.

It is of course also possible to add polymerization regulators.

The polymerization of the ethylenically unsaturated monomer or of the mixture of ethylenically unsaturated monomers of the binder component a) can be carried out by slowly adding the ethylenically unsaturated monomer or the mixture of ethylenically unsaturated monomers to the aqueous polyurethane resin dispersion. In this case it is possible either to add the entire amount of the monomers all at once or else to introduce only a portion initially and to meter in the remainder subsequently in the course of the reaction. However, the monomers to be polymerized can also be brought into the form of a preemulsion with the aid of a portion of the polyurethane resin dispersion and water, this preemulsion then being added slowly to the initial charge. The feed time of the monomers to be polymerized is generally 2–8, preferably about 3–4, hours. The water-insoluble initiators can be added to the initial charge or added dropwise together with the monomers. They may also be added fractionally to the initial charge, which contains a portion of the monomers. The remainder of initiator is then metered in together with the remaining monomers. The reaction temperature is a function of the decomposition rate of the initiator or initiator mixture and can be lowered if desired by means of suitable organic redox systems. The polymerization of the ethylenically unsaturated monomer or mixture of ethylenically unsaturated monomers takes place generally at a temperature of from 30 to 100° C., in particular at a temperature of from 60 to 95° C. If operating at superatmospheric pressure, the reaction temperatures may rise above 100° C.

The ethylenically unsaturated monomer or mixture of ethylenically unsaturated monomers is to be selected such that the binder component a) obtained in the manner described above has a hydroxyl number of 0–100, preferably 0–80 and an acid number of 10–40, preferably 15–30.

Next, the binder component b) is described in detail below. To prepare it, first of all, a polyurethane resin (B) is prepared in a first step in accordance with well-known methods of polyurethane chemistry.

The polyurethane resin (B) is prepared from the following components: (b1) a polyester- and/or polyethenepolyol having a number-average molecular weight of from 400 to 5000, or a mixture of such polyester- and/or polyetherpolyols; (b2) a polyiso-cyanate or a mixture of polyisocyanates; (b3), if desired, a compound which contains not only a polymerizable double bond but also at least one NCO-reactive group as well, or a mixture of such compounds; (b4), if desired, a compound which has in the molecule at least one isocyanate-reactive group and at least one group which is capable of forming anions, or a mixture of such compounds; (b5), if desired, a compound which has in the molecule at least one NCO-reactive group and at least one poly(oxyalkylene) group, or a mixture of such compounds; and, if desired, (b6) a hydroxyl- and/or amino-containing organic compound having a molecular weight of from 60 to 600, or a mixture of such compounds.

The polyurethane resin (B) is intended to have a number-average molecular weight of from 200 to 30,000, preferably from 1000 to 5000 and to contain on average from 0.05 to 1.1, preferably from 0.2 to 0.9, with particular preference from 0.3 to 0.7, polymerizable double bonds per molecule. It is preferred for the polyurethane resin (B) to have an acid number of from 0 to 2.0. The molecular weight can—as is known to the skilled worker—be controlled in particular by the proportion and the functionality of the starting compounds (b1) to (b6) that are used.

The polyurethane resin (B) can be prepared either in bulk or else in organic solvents.

A polyurethane resin (B) can be prepared by reacting all starting compounds simultaneously. In many cases, however, it is judicious to prepare the polyurethane resin (B) in stages. Thus it is possible, for example, to use components (b1) and (b2) to prepare a prepolymer which contains isocyanate groups and is then reacted further with component (b3). It is also possible to use components (b1), (b2), (b3) and, if desired, (b4) and (b5) to prepare a prepolymer which contains isocyanate groups and can then be reacted with component (f) to give polyurethanes of higher molecular mass. In cases where a compound used as component (b3) contains only one isocyanate-reactive group, it is possible in a first stage to use (b2) and (b3) to prepare a precursor which contains isocyanate groups and can then be reacted further with the other components.

The reaction of the components (b1) to (b6) is judiciously carried out in the presence of catalysts, such as dibutyltin dilaurate, dibutyltin maleate and tertiary amines, for example.

The amounts of component (b1), (b2), (b3), (b4), (b5) and (b6) to be used are a function of the target number-average molecular weight and of the target acid number. The polymerizable double bonds can be introduced into the polyurethane molecules by using components (b1) having polymerizable double bonds and/or by means of the component (b3). It is preferred to introduce the polymerizable double bonds by way of the component (b3).

As component (b1) it is possible to use the compounds described for component (a1) of the polyurethane resin of the binder component a). All remarks made in relation to component (a1) apply accordingly. The same applies to component (b2) in relation to component (a2), to component (b3) in relation to component (a6), to component (b4) in relation to component (a3), to component (b5) in relation to component (a4), and to component (b6) in relation to component (a7).

The ethylenically unsaturated monomers (A) which can be employed in the binder component b) also correspond in qualitative terms to those as described for binder component a). In detail, however, different proportions are preferred. In the case of the binder component b) it is preferred to use mixtures in which component (i) is used in an amount of from 40 to 100, preferably from 60 to 90% by weight, component (ii) in an amount of from 0 to 20, preferably from 3 to 12% by weight, component iii) in an amount of from 0 to 30, preferably from 5 to 15% by weight, component (iv) in an amount of from 0 to 30, preferably from 0 to 10% by weight, and component (v) in an amount of from 0 to 5, preferably 0% by weight, the sum of the weight fractions of (i) to (v) always being 100% by weight.

As far as the component (v) is concerned, preference is given in connection with the binder component b) to the use of difunctional unsaturated monomers such as butanediol diacrylate or hexanediol diacrylate. When using glycidyl methacrylate and methacrylic acid, the corresponding glycerol dimethacrylate is formed automatically during the polymerization. The nature and amount of polyunsaturated monomers must be carefully matched with the reaction conditions (catalysts, reaction temperature, solvents) in order that no gelling is obtained. The purpose of the amount of polyunsaturated monomers added is to raise the average molar mass without instances of gelling. However, it is preferred not to add any polyunsaturated monomer.

A binder component b) is prepared by preparing a solution of the polyurethane resin (B) in an organic solvent or an organic solvent mixture, polymerizing ethylenically unsaturated monomers or a mixture of ethylenically unsaturated monomers in this solution in a free-radical polymerization, and converting the resulting reaction product into an aqueous dispersion. It is preferred to use water-miscible organic solvents. Examples of solvents which can be used are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether and 3-methyl3-methoxybutanol or mixtures of these solvents. Preference is given to ketones, such as, for example, acetone, methyl ethyl ketone, diethyl ketone and methyl isobutyl ketone.

The free-radical polymerization is conducted at temperatures from 80 to 160° C., preferably from 100 to 160° C., in the abovementioned organic solvents or solvent mixtures. Examples of polymerization initiators which can be used are initiators which form free radicals, such as, for example, benzoyl peroxide, azobisisobutyronitrile and butyl peroxyethylhexanoate. In the course of the polymerization, there are also grafting reactions between the polyurethane resin (B) and the component (A).

The polymers prepared from (A) and (B) and used in accordance with the invention must contain groups which are capable of forming anions and which, prior to or during the conversion of the polymers from the organic solvent or solvent mixture into water, are neutralized and allow the formation of stable aqueous dispersions. The polymers in question may include, in addition to the groups capable of forming anions, nonionic stabilizing groups such as, for example, poly(oxyalkylene) groups, especially poly (oxyethylene) and/or poly(oxypropylene) and/or poly (oxyethylene)-(oxypropylene) groups.

The amount of the groups employed which are capable of forming anions should be sufficiently high fox the polymers of the binder component b) to have an acid number of from 5 to 200, preferably from 10 to 40, with particular preference from 15 to 30. The groups capable of forming anions can be introduced into the polymers in question, for example, by way of the components (b4) and (iii). The groups capable of forming anions can be present exclusively in component (A) or exclusively in component (B) or both in component (A) and in component (B). It is preferred for from 50 to 100, preferably from 70 to 100, with particular preference 100% of the groups capable of forming anions to be present in component (A).

The introduction of poly(oxyalkylene) groups into the polymers of the binder component b) can take place by way of component (b5) or by way of ethylenically unsaturated monomers which contain at least one poly(oxyalkylene) group (e.g., poly(oxyethylene) (meth)acrylate). The polymers should not contain excessive amounts of poly (oxyalkylene) groups, since otherwise the moisture resistance of the coating films may be lowered. The poly (oxyalkylene) group content can be from 1 to 10% by weight, preferably from 1 to 5% by weight (based on the weight of the polymer prepared from (A) and (B)).

The polymers prepared from (A) and (B) which are used should preferably not contain any nonionic stabilizing groups.

The polymers prepared from (A) and (B) should preferably have a hydroxyl number of from 0 to 100, with particular preference from 20 to 80. The number-average molecular weight of the polymers should be preferably from 2000 to 20,000, with particular preference from 5000 to 12,000.

Particularly preferred polymers are those polymers prepared from (A) and (B) which have a polydispersity index Q of from 5 to 90, preferably from 10 to 30. The polydispersity index is the quotient $M_w$ : $M_n$, $M_w$ being the weight-average and $M_n$ the number-average molecular weight.

The polydispersity index can be influenced, for example, by careful use of regulators and by the nature of the solvents employed. In addition, Q is influenced by the polymerizable double bond content of component (B). Q becomes greater the smaller the amount of regulator employed and the smaller the amount of solvents employed which are able to function as regulators. The lower the polymerizable double bond content of component (B), the greater Q becomes. Q can be determined by means of gel permeation chromatography using a polystyrene standard.

Once polymerization of component (A) has ended, the polymer obtained is subjected to at least partial neutralization and is dispersed in water.

Neutralization can be carried out using both organic bases and inorganic bases, such as ammonia and hydrazine. It is preferred to use primary, secondary and tertiary amines, such as, for example, ethylamine, propylamine, dimethylamine, dibutylamine, cyclohexyl-amine, benzylamine, morpholine, piperidine and triethanolamine. It is particularly preferred to use tertiary amines as neutralizing agents, especially dimethylethanolamine, triethylamine, tripropylamine and tributylamine or else aminomethylpropanol.

Some or, preferably, all of the organic solvents can be removed by distillation from the resulting aqueous binder dispersions of the binder component b). The binder dispersions b) contain polymer particles whose average particle size lies between 10 and 500 nm, preferably between 60 and 150 nm (measurement method: laser light scattering, measurement apparatus: Malvern Autosizer 2 C).

From a binder dispersion of the invention comprising the binder components a) and b) it is possible in accordance with well-known methods to prepare aqueous coating materials, especially aqueous solid-color basecoats and aqueous metallic basecoats. The basecoats can also be used for refinish purposes and can be overcoated with both aqueous and conventional clearcoats, powder coating materials and powder slurry coating materials.

In addition to the binder components a) and b), coating materials of the invention may also include further compatible water-dilutable synthetic resins, such as, for example, amino resins, polyurethane resins, polyacrylate resins, polyesters and polyethers.

Coating materials in accordance with the invention contain preferably from 5 to 90, with particular preference from 40 to 70, % by weight of binder component a) plus binder component b), the percentages by weight being based on the overall solids content of the basecoats.

As pigments it is possible for basecoats of the invention to contain coloring pigments on an inorganic basis, such as titanium dioxide, iron oxide, carbon black, etc., for example, coloring pigments on an inorganic basis, and customary metal pigments (e.g., commercially customary aluminum bronzes, stainless steel bronzes) and nonmetallic effect pigments (e.g., pearl luster and interference pigments). The level of pigmentation is within customary ranges. A particular advantage of the binder b) used in accordance with the invention is that it can also be used as a grinding resin and gives very stable pigment pastes.

Furthermore, coating materials of the invention can have added to them crosslinked polymeric microparticles, as disclosed, for example, in EP-A-0038127, and/or customary inorganic or organic additives. For example, effective thickeners include inorganic sheet silicates, water-soluble cellulose ethers, such as hydroxyethylcellulose, methylcellulose or carboxymethylcellulose and also synthetic polymers having ionic and/or associative groups, such as polyvinyl alcohol, poly(meth)acrylamide, poly(meth)acrylic acid, polyvinylpyrrolidone, styrene-maleic anhydride or ethylene maleic anhydride copolymers and their derivatives or else hydrophobically modified ethoxylated urethanes or polyacrylates and also carboxyl-containing polyacrylate copolymers having an acid number of from 60 to 780, preferably from 200 to 500.

Basecoats of the invention generally have a solids content of from about 15 to 50% by weight. The solids content varies with the intended use of the coating compositions. For metallic coating materials, for example, it is preferably from 17 to 25% by weight. For solid-color coating materials it is higher, for example from 30 to 45% by weight. The coating materials of the invention may additionally include customary organic solvents. The proportion thereof is kept as low as possible. For example, it is below 15% by weight.

Coating materials of the invention are generally adjusted to a pH of between 6.5 and 9.0. The pH can be adjusted using customary amines, such as ammonia, triethylamine, dimethylaminoethanol, N-methylmorpholine and aminomethylpropanol, for example.

Basecoats of the invention can be overcoated with aqueous, conventional coating materials, transparent powder coating materials or powder slurry coating materials.

Using basecoats of the invention, high-quality coating systems can also be produced without overcoating with a transparent topcoat. The one-coat systems obtained in this way are notable in particular for high gloss, good mechanicotechnological properties, and a high level of resistance to condensation.

Aqueous coating materials of the invention can be applied to any desired substrates, such as metal, wood, plastic or paper, for example. Application can be made directly or, as is usual in the automobile industry, following the application of an electrodeposition primer and a surfacer. The coating materials of the invention can be applied by spraying, knifecoating, dipping or rolling, preferably by electrostatic and pneumatic spraying.

In the examples which follow the invention is elucidated further. All parts and percentages are by weight unless expressly stated otherwise.

EXAMPLE 1

Aqueous Dispersion of the Binder Component a)

In a reaction vessel with stirrer and reflux condenser, 173.3 g of a polyesterdiol having a number-average molecular weight of 1480, based on a dimer fatty acid (Pripol$^R$1013), isophthalic acid and hexanediol are dissolved, following the addition of 20.2 g of dimethylolpropionic acid and 7.2 g of trimethylolpropane monoallyl ether, in 43.3 g of N-methylpyrrolidone and 78.5 g of methyl ethyl ketone. Following the addition of 88.1 g of isophorone diisocyanate, the mixture is heated to 80° C. and held at this temperature until the NCO content is 1.8%. After the mixture has cooled to 50° C., 14.4 g of triethylamine, 567.6 g of deionized water and 7.3 g of aminoethylethanolamine are added with stirring in rapid succession. The temperature is then raised to 60° C. and the methyl ethyl ketone is distilled off under reduced pressure. The polyurethane dispersion obtained in this way has a solids content of 34% and a pH of 8.2.

437.5 g of this polyurethane dispersion are diluted with 275.7 g of deionized water. After heating to 85° C., a preemulsion of 50.1 g of methyl methacrylate, 50.1 g of styrene, 37.5 g of n-butyl acrylate, 37.5 g of hydroxyethyl methacrylate and 77.2 g of the polyurethane dispersion prepared above is added with stirring over the course of 2.5 hours. With the commencement of the addition of this mixture, a solution of 2.6 g of t-butyl perethylhexanoate in 32.0 g of methoxypropanol is added over the course of three hours. Subsequently, the mixture is held at 85° C. until the monomers have been fully consumed by the reaction. If appropriate, further initiator is added. The dispersion obtained in this way, with a very low coagulum fraction, exhibits excellent stability at a solids content of 35% and a pH of 7.2.

EXAMPLE 2

Aqueous Dispersion of the Binder Component b)

In a reaction vessel with stirrer, reflux condenser and two feed vessels, 9.3 g of neopentyl glycol, 3.0 g of trimethylolpropane monoallyl ether, 0.1 g of dibutyltin dilaurate, 110.2 g of methyl isobutyl ketone and 63.5 g of isophorone diisocyanate are added to a mixture of 77.6 g of a polyesterdiol having a number-average molecular weight of 630 and based on an adipic acid, hexanediol and neopentyl glycol. The reaction mixture is subsequently heated to 105° C. At an NCO content of 1.8%, 15.1 g of trimethylolpropane are added to the reaction mixture and reaction is continued until isocyanate groups can no longer be detected.

At a temperature of 105° C., subsequently, a mixture of 69.6 g of n-butyl acrylate, 69.6 g of methyl methacrylate, 16.6 g of hydroxypropyl methacrylate and 13.0 g of acrylic acid is added to the reaction mixture over the course of three hours. At the same time, 5.1 g of t-butyl peroxyethylhexanoate dissolved in 42.8 g of methyl isobutyl ketone are metered in over the course of 3.5 hours.

After a further 2.5 hours at 105° C., the reaction mixture is cooled to 90° C. Then 10.6 g of dimethylethanolamine and 483.2 g of deionized water are added.

Following removal of the methyl isobutyl ketone under reduced pressure, a stable 42% aqueous dispersion having a pH of 7.9 is obtained.

EXAMPLE 3

Solid-color Aqueous Basecoat 200 g of binder component b) as per Example 2 are predispersed in a dissolver at 21 m/s for 15 minutes together with 4 g of Surfynolhu R 104 (2,4,7,9-tetramethyl-5-decyne-4,7-diol), 50 g of deionized water, 40 g of butyl diglycol, 3 g of a commercially customary defoamer and 250 g of a white pigment (titanium dioxide), and this initial dispersion is then ground in a bead mill for 30 minutes at a maximum temperature of 50° C.

To 547 g of the above-described millbase there are added 250 g of the binder component a), 53 g of a commercially customary melamine resin, 30 g of butyl glycol, 20 g of Shellsol$^R$ T (hydrocarbon mixture, aliphatic, in the range C11–C13 (isoparaffins)), 20 g of N-methylpyrrolidone, 10 g of 2-ethylhexanol and 70 g of deionized water, with stirring. The pH of the basecoat is subsequently adjusted to 8.3 using dimethylethanolamine.

EXAMPLE 4

Comparison of a Coating System Obtained by Means of the Coating Material According to Example 3 with Coating Systems in Each Case on Only one of the Binder Components a) or b)

A coating material according to Example 3 was applied by electrostatic spraying to a substrate of zinc-phosphatized sheet body metal which had been coated with a commercially customary electrodeposition coating material and a commercially customary surfacer, application giving a dry-film thickness of from about 12 to 30 pm. After a short time for evaporation, the system was overcoated with a commercially customary clearcoat and baked at 130° C. for 30 minutes. A well-leveled finish was obtained.

Corresponding coating materials were prepared on the basis of the binder components a) and b). In this respect, reference is made individually to the literature references DE 4010176 and DE P 4339870.7. Coating systems were prepared in the manner described above using each of the coating materials obtained in this way.

A comparative investigation of the mechanical properties of the coating systems obtained in this way showed that a coating system prepared with a coating material of the invention has a considerably higher stone-chip resistance (measureable, for example, by bombardment with 1000 g of angular chilled cast shot, 4–5 mm diameter, in an Erichsen stone-chip device 508 in accordance with VDA [German Automakers Association]) than the comparative coating systems based on coating materials with in each case only one of the binder components a) or b).

A metal sheet coated as above was overcoated further with a coating material of the invention (in accordance with Example 3) and, after a short evaporation period, with a commercially customary clearcoat and was baked at 130° C. for 30 minutes (high bake refinish) or, after a short flash-off period, was overcoated with a commercially customary two-component refinish clearcoat and dried at 80° C. for 40 minutes (low bake refinish). A comparative investigation of the mechanical properties of the refinish systems obtained in this way with comparison coating systems based on the binders a) or b) alone likewise showed a markedly better adhesion of the coating system produced with the coating material of the invention.

What is claimed is:

1. An aqueous coating material which comprises 5–95% by weight (based on the total weight of the overall binder content) of a first binder component a) and 5–95% by weight (based on the total weight of the overall binder content) of a second binder component b), the first binder component a) being obtained by subjecting a first monomer component selected from the group consisting of ethylenically unsaturated monomers and mixtures of ethylenically unsaturated monomers to free-radical polymerization in an aqueous dispersion of a first polyurethane resin which has a number-average molecular weight of from 1000 to 30,000 and which contains on average from 0.05 to 1.1 polymerizable double bonds per molecule, in the presence of one or more water-insoluble initiators, the weight ratio between the first polyurethane resin and the first monomer component being in a range between 1:10 and 10:1, and the second binder component b) being obtained by subjecting (A) a second monomer component selected from the group consisting of ethylenically unsaturated monomers and mixtures of ethylenically unsaturated monomers to polymerization in one or more organic solvents in the presence of (B) a second polyurethane resin, having a number-average molecular weight of from 200 to 30,000 and containing on average from 0.05 to 1.1 polymerizable double bonds per molecule, and converting the resulting polymer into an aqueous dispersion.

2. The aqueous coating material of claim 1, wherein the first polyurethane resin of the first binder component a) comprises a group containing polymerizable double bonds selected from the group consisting of acrylate, methacrylate and allyl ether functional groups.

3. The aqueous coating material of claim 1, wherein the first polyurethane resin of the first binder component a) is anionic and has an acid number in a range from 20 to 60.

4. The aqueous coating material of claim 1, wherein the first monomer component of first binder component a) comprises:

(i) from 40 to 100% by weight of an ester component selected from the group consisting of aliphatic esters of acrylic acid, aliphatic esters of methacrylic acid, cycloaliphatic esters of acrylic acid, cycloaliphatic esters of methacrylic acid, and mixtures thereof, said ester component containing neither hydroxyl nor carboxyl groups, (ii) from 0 to 30% by weight of an ethylenically unsaturated monomer which carries at least one hydroxyl group in the molecule, or a mixture of such monomers, (iii) from 0 to 10% by weight of an ethylenically unsaturated monomer which carries at least one carboxyl group in the molecule, or a mixture of such monomers, (iv) from 0 to 50% by weight of an ethylenically unsaturated monomer other than (i), (ii) and (iii), or a mixture of such monomers, and (v) from 0 to 5% by weight of an ethylenically polyunsaturated monomer or a mixture of such monomers, the sum of the weight fractions of (i), (ii), (iii), (iv) and (v) always being 100% by weight.

5. The aqueous coating material of claim 1, wherein the polymer of the second binder component b), which is prepared from (A) and (B), has an acid number of from 5 to 200, a hydroxyl number of from 0 to 100, and a number-average molecular weight of from 2000 to 20,000.

6. The aqueous coating material of claim 1, wherein the polymer of the second binder component b) which is prepared from (A) and (B) has a polydispersity index $Q=M_w:M_n$ of from 5 to 90.

7. The aqueous coating material of claim 1, wherein the polymer of the second binder component b) is obtained from components (A) and (B) in a weight ratio of from 1:10 to 10:1.

8. The aqueous coating material of claim 1, wherein, as component (B) of the binder component b), a polyurethane resin is used containing polymerizable double bonds which have been introduced by incorporating compounds containing at least two NCO-reactive groups into the molecules of the polyurethane resin.

9. The aqueous coating material of claim 1, wherein, as component (B) of the binder component b), a polyurethane resin is used which comprises allyl ether groups as polymerizable double bonds.

10. The aqueous coating material of claim 1, wherein as component (B) of the binder component b) a polyurethane resin is used which comprises trimethylolpropane monoallyl ether.

11. The aqueous coating material of claim 1, wherein the polymer of the binder component b) is obtained using as component (B) a polyurethane resin which has an acid number of from 0 to 2.0.

12. The aqueous coating material of claim 1, wherein the polymer of the binder component b) is obtained using as component (B) a polyurethane resin which has a number-average molecular weight of from 1000 to 5000 and contains on average from 0.2 to 0.9 polymerizable double bonds per molecule.

13. The aqueous coating material of claim 1, which further comprises one or more pigments.

14. A method of coating a substrate surface, comprising the steps of:

(1) applying a basecoat according to claim 1 to the substrate surface, (2) forming a basecoat film from the basecoat applied in step (1), (3) applying a transparent topcoat to the resulting basecoat film, and subsequently (4) baking the basecoat film together with the topcoat film.

15. The method of claim 14 wherein the substrate comprises a motor vehicle body surface.

16. The aqueous coating material of claim 5, wherein the polymer of the second binder component b) has an acid number of from 10 to 40, a hydroxyl number of from 20 to 80, and a number-average molecular weight of from 5,000 to 12,000.

17. The aqueous coating material of claim 6, wherein the polymer of the second binder component b) has a polydispersity index $M_w:M_n$ of from 10 to 30.

18. The aqueous coating material of claim 7, wherein the polymer of the second binder component b) is obtained from polymerizing components (A) and (B) in a weight ratio in a range from 1:2 to 2:1.

* * * * *